Sept. 19, 1961  E. LOWE ET AL  3,000,294
FILTER PRESS
Filed Oct. 1, 1957  4 Sheets-Sheet 1

E. LOWE, W.C. ROCKWELL,
W.E. HAMILTON
INVENTORS
BY
R. Hoffman  ATTORNEY

E. LOWE, W.C. ROCKWELL,
W.E. HAMILTON
INVENTORS

Sept. 19, 1961

E. LOWE ET AL 3,000,294

FILTER PRESS

Filed Oct. 1, 1957

E. LOWE, W.C. ROCKWELL,
W.E. HAMILTON
INVENTORS

BY
R. Hoffman ATTORNEY

United States Patent Office

3,000,294
Patented Sept. 19, 1961

---

3,000,294
FILTER PRESS
Edison Lowe, William C. Rockwell, and Walter E. Hamilton, El Cerrito, Calif., assignors to the United States of America as represented by the Secretary of Agriculture
Filed Oct. 1, 1957, Ser. No. 687,594
4 Claims. (Cl. 100—121)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to devices for effecting filtering and pressing operations. More particularly the invention is concerned with filter presses of the type which include two rotating cylindrical filter drums one being mounted eccentrically within the other and adapted to receive the material to be treated in the generally horn-shaped chamber which is formed between the converging filter surfaces.

Broadly speaking, devices of the type mentioned above are known in the art but the existing embodiments are subjected to certain disadvantages. One problem is that it is difficult to construct such devices wherein the drums are maintained in proper alignment while still providing means for adjusting the minimum distance between the converging filter surfaces. A common disadvantage of many devices is that the pressures of filtering and pressing are resisted by structural members acting in compression which must necessarily be of heavy, hence cumbersome, construction to resist bending forces. In some of the known devices, for example, French Patent 592,105, the forces of filtering and pressing are exerted through the equipment required for adjusting the minimum distance between the filter drums which means that this equipment must be of rugged construction to operate effectively. Another point is that the known types are so constructed that they are not suitable for treatment of food products because they cannot be readily disassembled for cleaning.

One object of the present invention is the provision of a filter press wherein the filter surfaces are maintained in alignment by a relatively simple mechanism. A particular feature of this alignment device is that it resists the forces exerted by filtering and pressing in pure tension whereby the full strength of the structural material is employed and bending stresses are eliminated. Another feature of the alignment device is that it automatically positions itself, and hence the distance between the filter surfaces, as dictated by the pressures existing between the filter surfaces. Moreover, in the press of this invention, the alignment device by itself resists the pressures which tend to separate the filter surfaces whereby no auxiliary equipment is required to control the distance between the filter surfaces. It is thus an object of the invention to provide a press with an alignment device which is adapted to maintain the filter surfaces in proper alignment, to automatically adjust the distance between the surfaces as dictated by pressures between the surfaces, to resist the forces tending to separate the surfaces in pure tension, and by its functions to eliminate the need for auxiliary means to adjust or maintain the distance between the filter surfaces. Another object of the invention is the provision of a filter press which is particularly adapted for treatment of food products because it may be readily disassembled for cleaning. Further objects and advantages of the invention will be evident from the following description taken in connection with the annexed drawing.

FIGS. 1, 2, and 3 are different views of the same embodiment of the invention. FIG. 1 is a horizontal section of the device, FIG. 2 is a longitudinal section (taken on plane A—A of FIG. 3), and FIG. 3 is a perspective representation of the device.

Although capable of general use in filtering and pressing operations, the device of the invention is particularly adapted for the dejuicing of fruit or vegetable pulps, materials containing such pulps, or similar substances containing liquid compounds and finely divided solid components. A feature of the device is that it is capable of efficiently dejuicing fruit pulps and similar materials which are ordinarily difficult to handle because of their content of colloidal materials such as pectin which tend to vitiate the action of conventional devices. Typical of the applications of the device of the invention is use to prepare juices from apples, grapes, pears, peaches, apricots, tomatoes, celery, watercress, spinach, sugar beets, and the like. Additionally the device is well adapted for the treatment of limed pear waste, citrus waste, fermentation liquors, distillers' slops, and the like for the separation of solid and liquid components.

Figure 1:
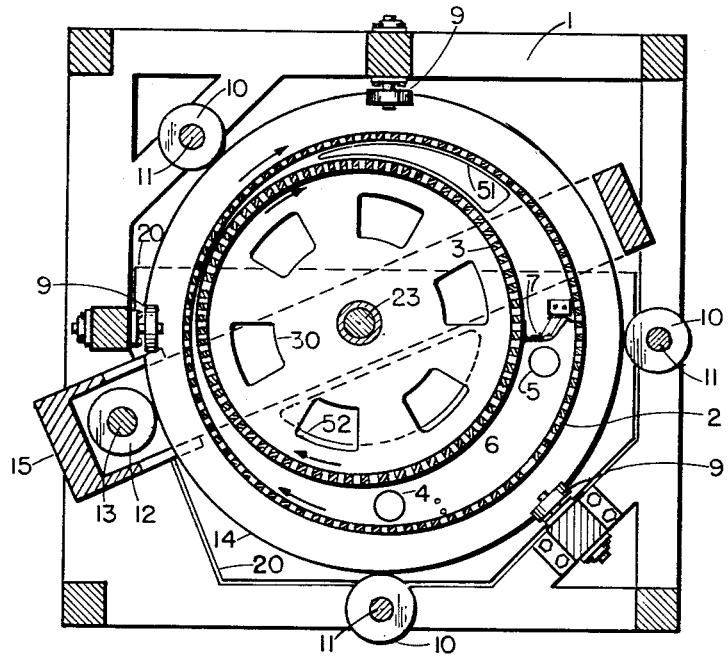

Referring now particularly to the annexed drawing wherein like numerals designate like parts the embodiment of the invention illustrated therein is described as follows:

Reference is first made to FIG. 1 which illustrates the general operations of the device. The illustrated embodiment includes frame 1 within which is mounted ring 2 and drum 3, the cylindrical surfaces of the ring and drum being made of perforated metal. The inner cylindrical surface of ring 2 and the outer cylindrical surface of drum 3 are preferably covered with filter cloth, wire screening, or other conventional filtering material. As evident in the figure, drum 3 is mounted eccentrically within ring 2 and the axis of each is in an essentially vertical plane.

Ring 2 and drum 3 are each rotated about their own axes in a clockwise direction and at the same peripheral speed at the filter surfaces. The material to be filtered and pressed is pumped under superatmospheric pressure through either or both of pipes 4 and 5 into chamber 6. This chamber constitutes the space between the filter surfaces divergently extending from the pinch point (where the filter surfaces are at minimum distance from one another) to adjustable dam 7 which closes the wide end of the chamber. As will be explained hereinafter, chamber 6 is sealed at top and bottom by pressure plates 45 and 46, shown in FIG. 4.

Since the material to be treated is pumped into chamber 6 under superatmospheric pressure, filtering action takes place therein and filter cakes form on the inner surface of ring 2 and the outer surface of drum 3. As the ring and drum rotate, the filter cakes are merged and gradually subjected to increasing pressure as the merged cake passes through the decreasing space between the ring and drum. The maximum pressure obtains at the pinch point where the space between the ring and drum is at a minimum. The pressing causes additional deliquefying of the filter cake. As the merged filter cake proceeds clockwise past the pinch point, the pressure is relieved because of the increasing distance between the filter surfaces, and the press cake falls off the filter surfaces, drops through outlet 51 and may be collected in a hopper and removed therefrom by a belt conveyor, screw conveyor or other conventional device.

The separated liquid leaves the system in this way: Liquid entering the interior of drum 3 flows through apertures 30 in the base of the drum, through port 52 in lower pressure plate 46 (FIG. 4) and thus into pan 20. Liquid passing through the filter surface of ring 2 flows over the lower flange 14 of ring 2 into pan 20. To assist in proper flow of the separated liquid, that is, away from the pinch point, the entire device is tilted a slight degree so that the side of the frame, shown at bottom in FIG. 1, is the low side of the device.

Figure 2:
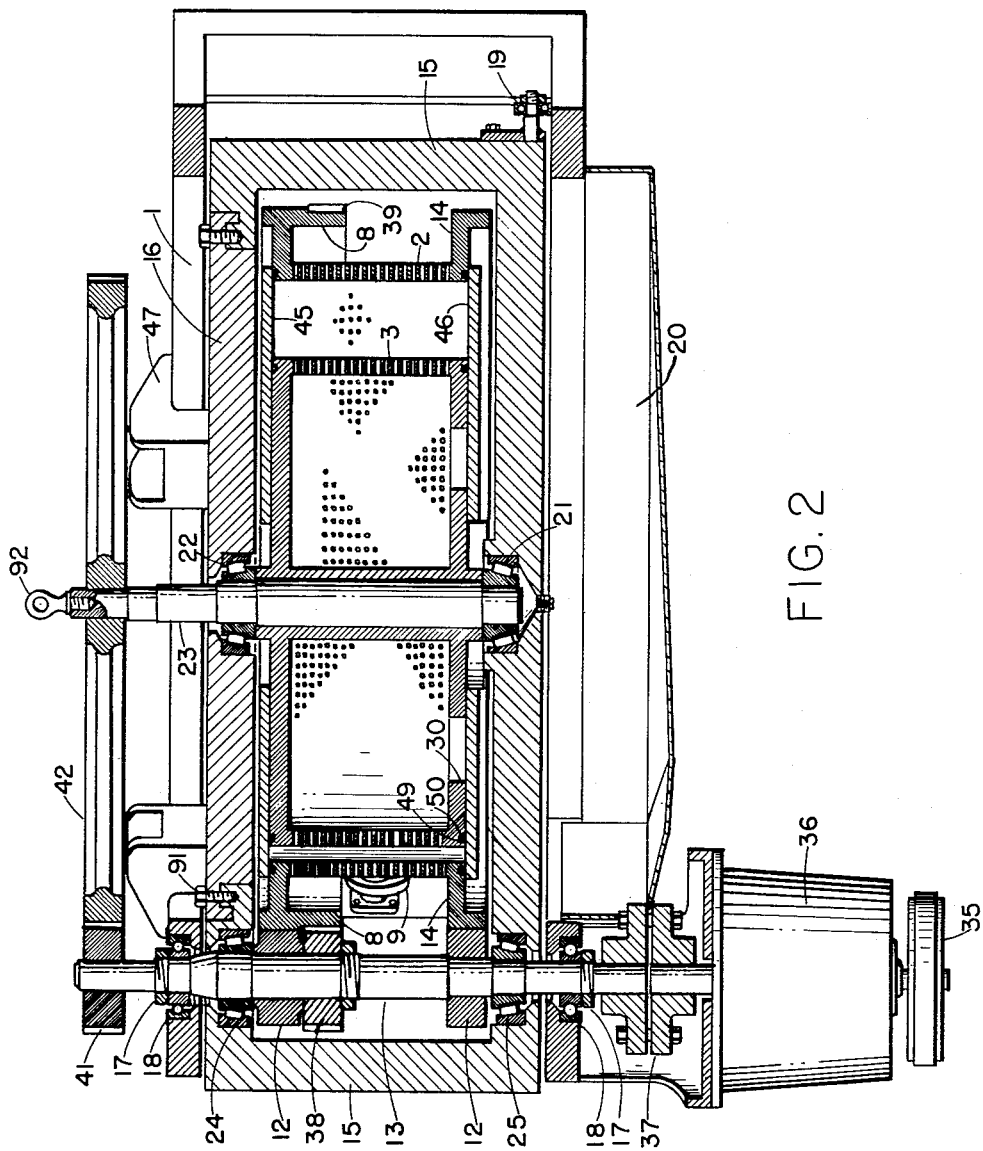

Referring now to FIG. 2, ring 2 is mounted within frame 1 whereby it may be rotated about a fixed center. Thus ring 2 has an upper flange 8 riding on rollers 9 attached to frame 1 which thus support the weight of the ring. To prevent lateral displacement of the ring, there are provided rollers 10 on shafts 11 (see FIGS. 1 and 3) and rollers 12 on shaft 13. The external peripheries of flanges 8 and 14 on ring 2 bear against these rollers 10 and 12 whereby the ring is kept in place though free to rotate.

As depicted in FIG. 2, the means for positioning drum 3 comprises a box-like frame, or yoke 15, which extends completely about ring 2. Yoke 15 includes a removable top member 16. Extending vertically through frame 1 is a rotatable shaft 13 which is held in position through the agency of nuts 17 and ball bearings 18. Yoke 15 is mounted on shaft 13 by thrust bearings 24 and 25 which permit independent rotation of yoke 15 in a horizontal plane while supporting the weight of the yoke and keeping it in alignment. To further help support the weight of yoke 15 there is provided a roller 19 attached to the yoke and riding on the base of frame 1.

Yoke 15 is provided with bearings 21 and 22 within which are positioned shaft 23 on which is keyed drum 3. It is thus evident that yoke 15 and shaft 23 position drum 3 in proper axial alignment within ring 2. When the press is in operation, the pressure of filtration and pressing (which would tend to separate the ring and drum) is resisted by yoke 15, the horizontal members of which act as virtually pure tension members in resisting this pressure. Moreover, yoke 15 serves as the means for automatically varying the distance between the filter surfaces at the pinch point. Thus the yoke is pivotable about shaft 13 through bearings 24 and 25 and when the yoke assumes the position such that its centerline passes through the center of ring 2, drum 3 will be a maximum distance from ring 2. When the yoke pivots counterclockwise (as viewed in FIG. 1), the degree of separation of the surface is reduced to a minimum. The operation of yoke 15 in this regard is further explained below in connection with FIG. 7.

Figure 3:
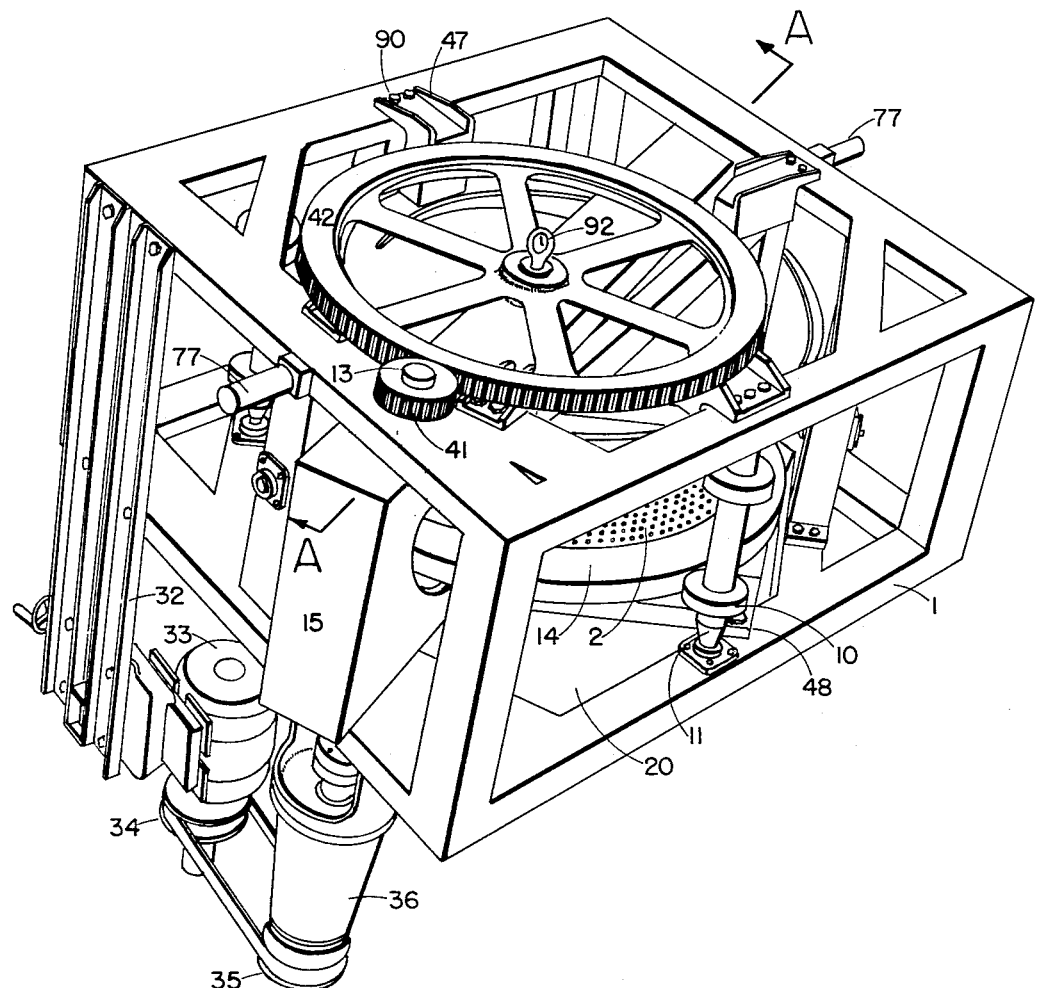

The means for rotating ring 2 and drum 3 are described as follows, referring particularly to FIGS. 2 and 3. On bracket 32 is secured electric motor 33 which through the medium of conventional speed-adjusting pulleys 34 and 35, reducing gear 36, and universal coupling 37 drives shaft 13. On shaft 13 is keyed pinion 38 which engages with teeth 39 extending along the periphery of flange 8 of ring 2. Drum 3 is rotated by shaft 13 through the intermediacy of pinion 41 keyed on shaft 13 and gear 42 keyed on shaft 23. The sizes of the pinions, gears, etc. are so selected that the ring and drum rotate in the same direction at the same peripheral speed at their filter surfaces.

Figures 4, 5:
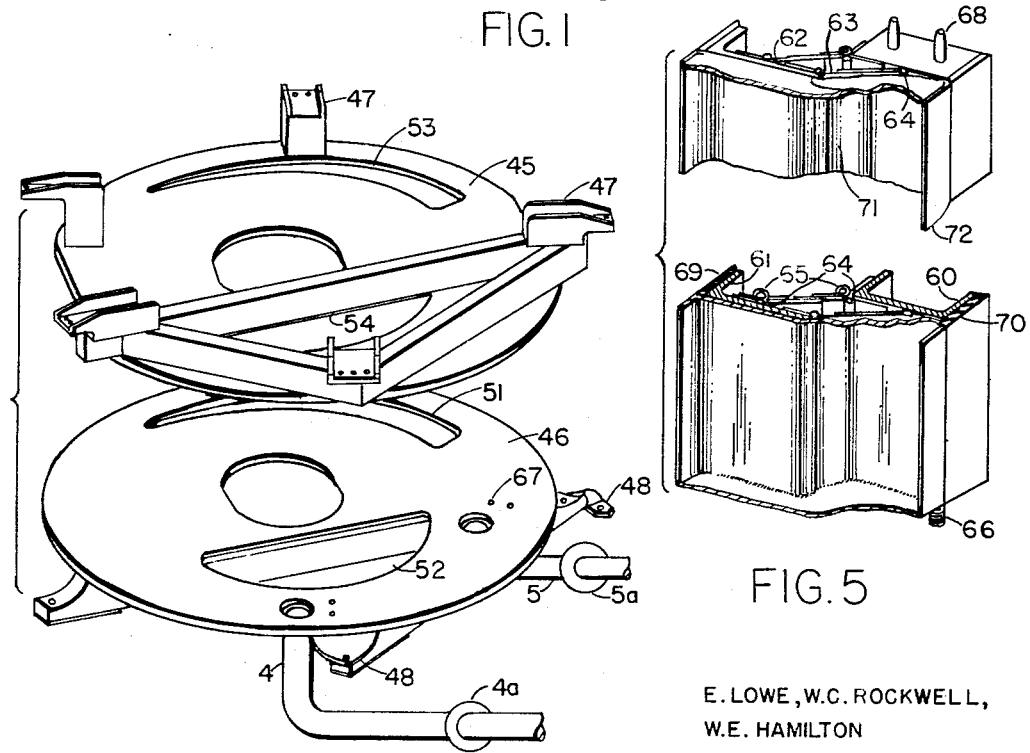
FIG. 4 is a perspective view illustrating the plates for sealing the chamber between the filter surfaces.
FIG. 5 is an enlarged, perspective view of the dam for sealing the wide end of the filter chamber.

Reference is now made to FIG. 4 which illustrates the plates 45 and 46 for sealing the top and bottom, respectively, of chamber 6 (the space between the filter surfaces extending from the pinch point to dam 7). Plates 45 and 46 are mounted by brackets 47 and 48 on frame 1. To prevent leakage of liquid the flat surfaces of ring 2 and drum 3 are provided with circularly extending grooves 49 and ring gaskets 50 made of Teflon, rubber, neoprene, or the like (see FIG. 2). Thereby chamber 6 is sealed so that liquid cannot leave chamber 6 except through the filter surfaces.

Lower plate 46 is provided with opening 51 through which the press cake passes as explained in connection with FIG. 1. Also provided is port 52 for passage of liquid which flows into the inside of drum 3. Apertures 53 and 54 in upper plate 4 are provided for cleaning and inspection purposes.

Also evident in FIG. 4 are supply pipes 4 and 5 and pumps 4a and 5a providing the means for pumping the material to be treated under pressure into chamber 6.

Illustrated in FIG. 5 are details of dam 7 which serves to seal the wide end of chamber 6. The dam includes channel 60 and angle 61 joined together by arms 62 and 63 and hinges 64. The arrangement of the arms and four hinges restricts relative movement between elements 60 and 61 in a parallel relationship. Springs 65 are provided for biasing elements 60 and 61 away from one another. In the assembled device, dam 7 is maintained in position by plates 45 and 46 in that bolts 66 pass through holes 67 in plate 46 (FIG. 4) and pins 68 pass through corresponding holes in plate 45. A pad 69 of Teflon, rubber, neoprene or the like on element 61 bears against the filter surface of drum 3 and a similar pad 70 on element 60 bears against the filter surface of ring 2. The face of the dam is covered with a blanket 71 of rubber, neoprene, or the like provided with flanges 72 of the same material. The material in chamber 6 pressing against the dam forces these flanges tightly against the plates 45 and 46 and against the filter surfaces so that effective sealing is attained.

Figures 6, 7:
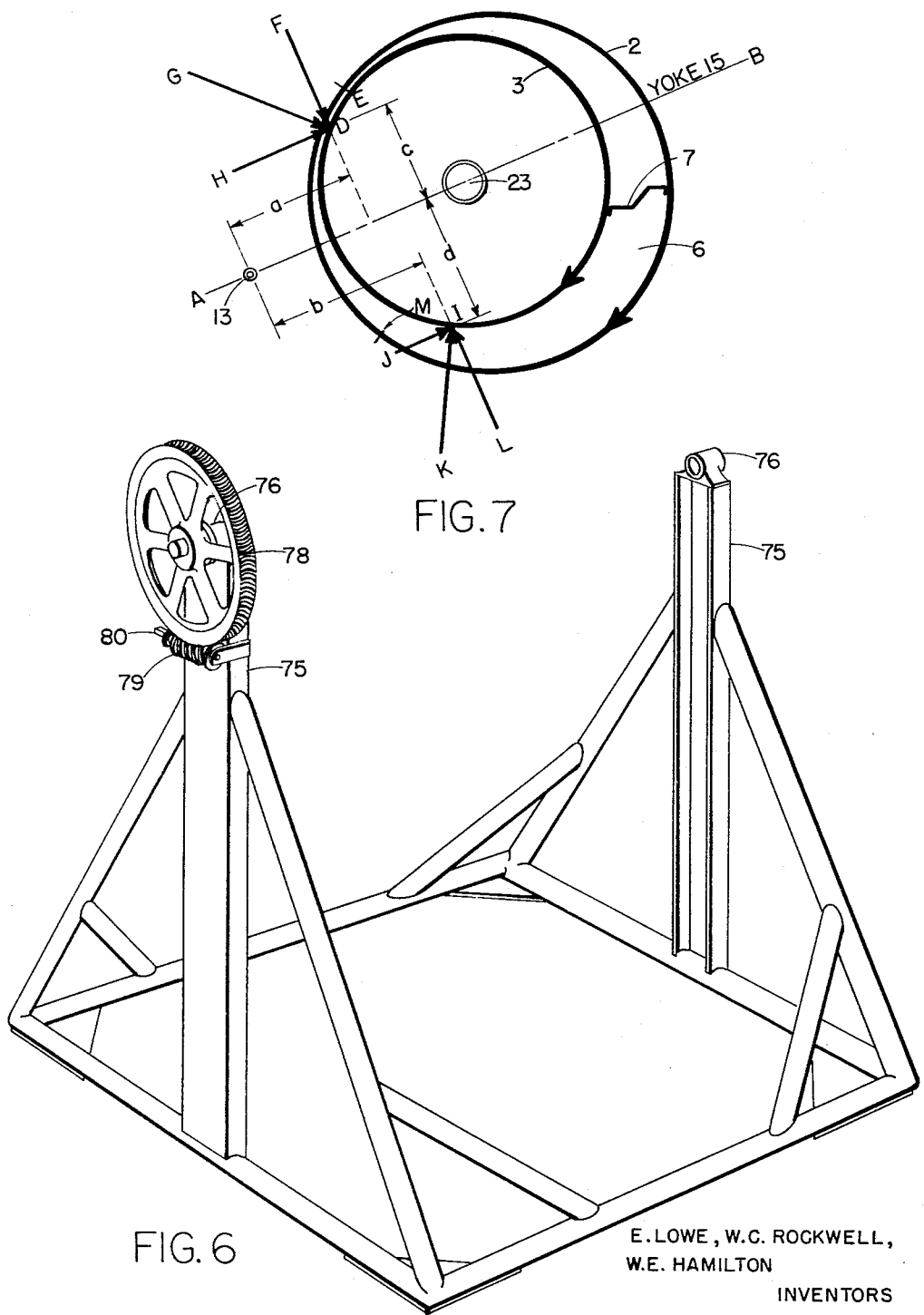
FIG. 6 is a perspective view of apparatus for supporting the press depicted in FIGS. 1–3.
FIG. 7 is a diagram illustrating the forces exerted during operation of the device.

Reference is now made to FIG. 6 which depicts apparatus for adjustably supporting the press. The apparatus includes supports 75 and bearings 76 which are adapted to receive stub shafts 77 mounted on frame 1 (FIG. 3). One of the shafts 77 is keyed to worm gear 78 and by suitable rotation of worm 79 by application of a wrench to squared axle end 80, the press may be tilted to the desired angle to ensure proper drainage of separated liquid into pan 20.

As noted above, the device of the invention is particularly adapted for handling of food products because it can be readily disassembled for cleaning. In order to disassemble the device, the following operations are done, referring to FIGS. 2 and 3: Bolts 90 holding brackets 47 to frame 1 are removed. Bolts 91 holding upper member 16 of yoke 15 are removed. Then by applying a suitable hoist to eye 92, the entire assembly including drum 3, shaft 23, member 16, plate 45, etc. is lifted out of frame 1. Ring 2 and lower plate 46 remain in the frame.

Reference is now made to FIG. 7 which illustrates the action of yoke 15. Line AB represents the center line of yoke 15 pivotable about shaft 13. Vector GD represents the summation of forces acting on one side of the yoke tending to pivot it in a clockwise direction. This summation of forces GD can be considered as the product of the pressure existing in the pressing zone and the peripheral area of drum 3 against which this pressure is exerted, the zone extending from yoke 15 to pinch point E. FD and HD represent the components of this force acting perpendicular and parallel, respectively, to the yoke. Point E is the pinch point where the greatest pressure is necessarily developed. Vector KI represents the summation of forces on the other side of the yoke tending to pivot in a counterclockwise direction. The force KI can be considered as the product of the pressure at which material is pumped into chamber 6 and the area of drum 3 extending from yoke 15 to dam 7 against which area the pressure is exerted. Vectors LI and JI represent, respectively, the components perpendicular and parallel to the yoke. It is evident from the diagram that under any particular conditions of operation, yoke 15 (line AB) will assume such a position as to equalize the moments of force on opposing sides of the yoke, namely, $$FD \times a + HD \times c = LI \times b + JI \times d$$

Thus yoke 15 being freely pivotable and subjected to turning forces on both sides must assume a position whereat the moments of force acting on opposite sides are in balance. It is to be emphasized that such action is obtained because yoke 15 is pivoted about an axis 13 which is angularly spaced by an acute angle from the pinch point in the direction of divergence of chamber 6. On the other hand, if the yoke were pivotable about an axis at pinch point E so that the yoke would extend through point E and shaft 23, the balancing effect would not be obtained because all the forces would tend to pivot the yoke in one direction. Likewise, if the yoke were pivoted on an axis at position M, 90° removed from the pinch point, no successful result would follow. In such case the yoke being subjected to essentially equal pressures on both sides would simply swing to a position such that drum 3 would assume a concentric position within ring 2 and no pinch point would be obtained hence no pressing effect. It is thus obvious that if the yoke is pivoted at the pinch point or 90° removed therefrom, auxiliary apparatus will have to be used to maintain the drum 3 in proper position whereas in the disclosed device, no auxiliary equipment is needed and the yoke automatically positions drum 3.

It is also evident from FIG. 7 that yoke 15 holds drum 3 in alignment with ring 2 by tension, that is, the sum of forces HD and JI.

FIG. 7 further illustrates another feature of the invention, namely, the manner in which the yoke will automatically position drum 3 as dictated by the pressure in chamber 6. For example, if the pressure at which the material is pumped into chamber 6 is increased, the yoke will pivot in a counterclockwise direction decreasing the clearance between the drum and ring at pinch point E thereby increasing the pressure in the pressing zone (the peripheral area from yoke 15 to point E) to counterbalance the added feed pressure. On the other hand, if the pressure at which the material is pumped into chamber 6 is decreased, the clearance at the pinch point will be increased by clockwise rotation of yoke 15. It is thus evident that the ultimate pressure at which the material is pressed and hence the proportion of liquid in the press cake is very easily regulated by simply increasing or decreasing the pressure at which the material is pumped into chamber 6; the higher the pumping pressure the greater will be the pressing effect and the drier will be the press cake. This system of operation makes for great flexibility without any need for the adjustment mechanisms as required by prior devices.

Having thus described the invention, what is claimed is:

1. A filter press comprising a frame; a first hollow rotatable cylinder provided with a foraminous filter surface; means for mounting said cylinder in the frame for rotation about a fixed center; a second hollow rotatable cylinder provided with a foraminous filter surface, said second cylinder having a diameter smaller than that of the first cylinder, said second cylinder being mounted with its axis parallel to the axis of the first cylinder and eccentrically within the first cylinder to provide a space therebetween comprising a pinch point where the cylinder surfaces are at a minimum distance from one another and extending divergently from said pinch point in a direction counter to the direction of rotation of said cylinders; means for rotating said cylinders in the same direction; means for feeding material into said space under superatmospheric pressure; means cooperating with said cylinders to prevent flow of material from said space except through said foraminous filter surfaces; a single freely-pivotable yoke for supporting said second cylinder and maintaining it in alignment with said first cylinder; and a shaft for pivoting said yoke, said shaft being parallel to the axes of the cylinders and journaled in the frame external to the first cylinder at a point arcuately spaced from the pinch point in a direction counter to the direction of rotation of said cylinders, whereby said yoke will pivot in a direction counter to the direction of rotation of said cylinders as the pressure on the material fed into said space is increased thereby decreasing the dimensions of the pinch point and increasing the pressure at which the material is pressed.

2. A filter press comprising a frame; a first hollow rotatable cylinder provided with a foraminous filter surface; means for mounting said cylinder in the frame for rotation about a fixed center; a second hollow rotatable cylinder provided with a foraminous filter surface, said second cylinder having a diameter smaller than said first cylinder, said second cylinder being mounted with its axis parallel to the axis of said first cylinder and eccentrically within the first cylinder to provide a space therebetween comprising a pinch point where the cylinder surfaces are at a minimum distance from one another and extending divergently from said pinch point in a direction counter to the direction of rotation of said cylinders; plate means and flexible sealing means cooperative with said cylinders to prevent flow of liquid from said space except through said foraminous surfaces; means for rotating said cylinders in the same direction; means for feeding material into said space under superatmospheric pressure; a single freely-pivotable yoke for supporting said second cylinder and maintaining it in alignment with said first cylinder; and a shaft for pivoting said yoke, said shaft being parallel to the axes of the cylinders and journaled in the frame external to the first cylinder at the point arcuately spaced from the pinch point in a direction counter to the direction of rotation of said cylinders, whereby said yoke will pivot in a direction counter to the direction of rotation of said cylinders as the pressure on the material fed into said space is increased thereby decreasing the dimensions of the pinch point and increasing the pressure at which the material is pressed.

3. A filter press comprising a frame; a first hollow rotatable cylinder provided with a foraminous filter surface; means for mounting said cylinder in the frame for rotation about a fixed center; a second hollow rotatable cylinder provided with a foraminous filter surface, said second cylinder having a diameter smaller than that of said first cylinder, said second cylinder being mounted with its axis parallel to the axis of the first cylinder and eccentrically within said first cylinder to provide a space therebetween comprising a pinch point where the cylinder surfaces are at a minimum distance from on another and extending divergently from said pinch point in a direction counter to the direction of rotation of said cylinders; plate means and flexible sealing means cooperative with said cylinders to prevent flow of liquid from the space through said foraminous filter surfaces; means for rotating said cylinders in the same direction; means for feeding material into said space under superatmospheric pressure; a single freely-pivotable yoke for supporting said second cylinder and maintaining it in alignment with said first cylinder, said yoke comprising a pair of arms extending along the ends of said cylinders; a first shaft for rotatably mounting said second cylinder extending between said arms, and a second shaft for pivoting said yoke, said second shaft being parallel to the axes of the cylinders and journaled in the frame external to the first cylinder at a point arcuately spaced from the pinch point in a direction counter to the direction of rotation of said cylinders, whereby said yoke will pivot in a direction counter to the direction of rotation of said cylinders as the pressure on the material fed into said space is increased thereby decreasing the dimensions of the pinch point and increasing the pressure at which the material is pressed.

4. A filter press comprising a frame; a first hollow rotatable cylinder provided with a foraminous filter surface; means for mounting said cylinder in the frame for rotation about a fixed center; a second hollow rotatable cylinder provided with a foraminous filter surface, said second cylinder having a diameter smaller than that of said first cylinder, said second cylinder being mounted with its axis parallel to the axis of the first cylinder and eccentrically within said first cylinder to provide a space therebetween comprising a pinch point where the cylinder surfaces are at a minimum distance from on another and extending divergently from said pinch point in a direction counter to the direction of rotation of said cylinders; plate means and flexible sealing means cooperative with said cylinders to prevent flow of liquid from said space except through the foraminous filter surfaces; means for rotating said cylinders in the same direction; means for feeding material into said space under superatmospheric pressure; a single freely-pivotable yoke for supporting said second cylinder, for maintaining it in alignment with said first cylinder, and for varying the minimum distance between said cylinder surfaces as dictated by the force of pressing and filtering, said yoke comprising a pair of arms extending along the ends of said cylinders diametrically to said second cylinder, a first shaft for rotatably mounting said second cylinder extending between said arms, and a second shaft for pivoting said yoke, said second shaft being parallel to the axes of the cylinders and journaled in the frame external to the first cylinder at a point arcuately spaced from the pinch point in a direction counter to the direction of rotation of said cylinders, whereby said yoke will pivot in a direction counter to the direction of rotation of said cylinders as the pressure on the material fed into said space is increased thereby decreasing the dimensions of the pinch point and increasing the pressure at which the material is pressed.

References Cited in the file of this patent

UNITED STATES PATENTS

| | | |
|---|---|---|
| 1,140,683 | Johansen | May 25, 1915 |
| 2,374,046 | Stacom | Apr. 17, 1945 |
| 2,682,832 | Lohre et al. | July 6, 1954 |
| 2,795,184 | Graham et al. | June 11, 1957 |

FOREIGN PATENTS

| | | |
|---|---|---|
| 729,102 | Germany | Dec. 10, 1942 |
| 1,045,356 | France | Apr. 27, 1955 |